United States Patent [19]
Cobb

[11] Patent Number: 6,052,212
[45] Date of Patent: Apr. 18, 2000

[54] METHOD AND APPARATUS FOR CORRECTING COMA IN A HIGH RESOLUTION SCANNER

[75] Inventor: Joshua M. Cobb, Victor, N.Y.

[73] Assignee: Eastman Kodak Company, Rochester, N.Y.

[21] Appl. No.: 09/211,237

[22] Filed: Dec. 14, 1998

[51] Int. Cl.[7] .................................................. G02B 26/08
[52] U.S. Cl. .......................... 359/208; 359/207; 359/216; 347/256
[58] Field of Search .................................... 349/208, 207, 349/206, 205, 216, 217, 218, 219, 213, 214, 858, 859; 347/256, 260

[56] References Cited

U.S. PATENT DOCUMENTS

| | | | |
|---|---|---|---|
| 3,897,132 | 7/1975 | Meeussen et al. | 350/7 |
| 4,633,272 | 12/1986 | Hardy | 346/108 |
| 4,759,593 | 7/1988 | Kessler | 350/6.8 |
| 4,832,429 | 5/1989 | Nagler | 350/6.8 |
| 4,848,885 | 7/1989 | Clark | 350/469 |
| 5,168,386 | 12/1992 | Galbraith | 359/215 |
| 5,235,438 | 8/1993 | Sasada | 358/481 |
| 5,267,057 | 11/1993 | Sasada | 358/481 |
| 5,343,326 | 8/1994 | Ossman | 359/216 |
| 5,768,001 | 6/1998 | Kelley et al. | 359/196 |

*Primary Examiner*—Cassandra Spyrou
*Assistant Examiner*—Leo Boutsikaris
*Attorney, Agent, or Firm*—William F. Noval

[57] ABSTRACT

A method of correcting a scanning device's reflective face's pyramid error as well as coma in the cross scan direction of an optical scanning system comprising the steps of: focusing a beam of light to a spot in the cross scan axis in the vicinity of the scanning device's reflective face with a first cylinder mirror which is tilted at an angle to produce a fixed, known amount of coma in the spot focused in the cross scan axis; and imaging the location of the reflective face, and thus reimaging the spot, to a second image position with a second cylinder mirror which is tilted at a second angle, the second cylinder mirror imaging the spot with a fixed and known amount of coma in the cross scan axis which is approximately equal to and opposite in sign to the first fixed, known amount of coma.

22 Claims, 2 Drawing Sheets

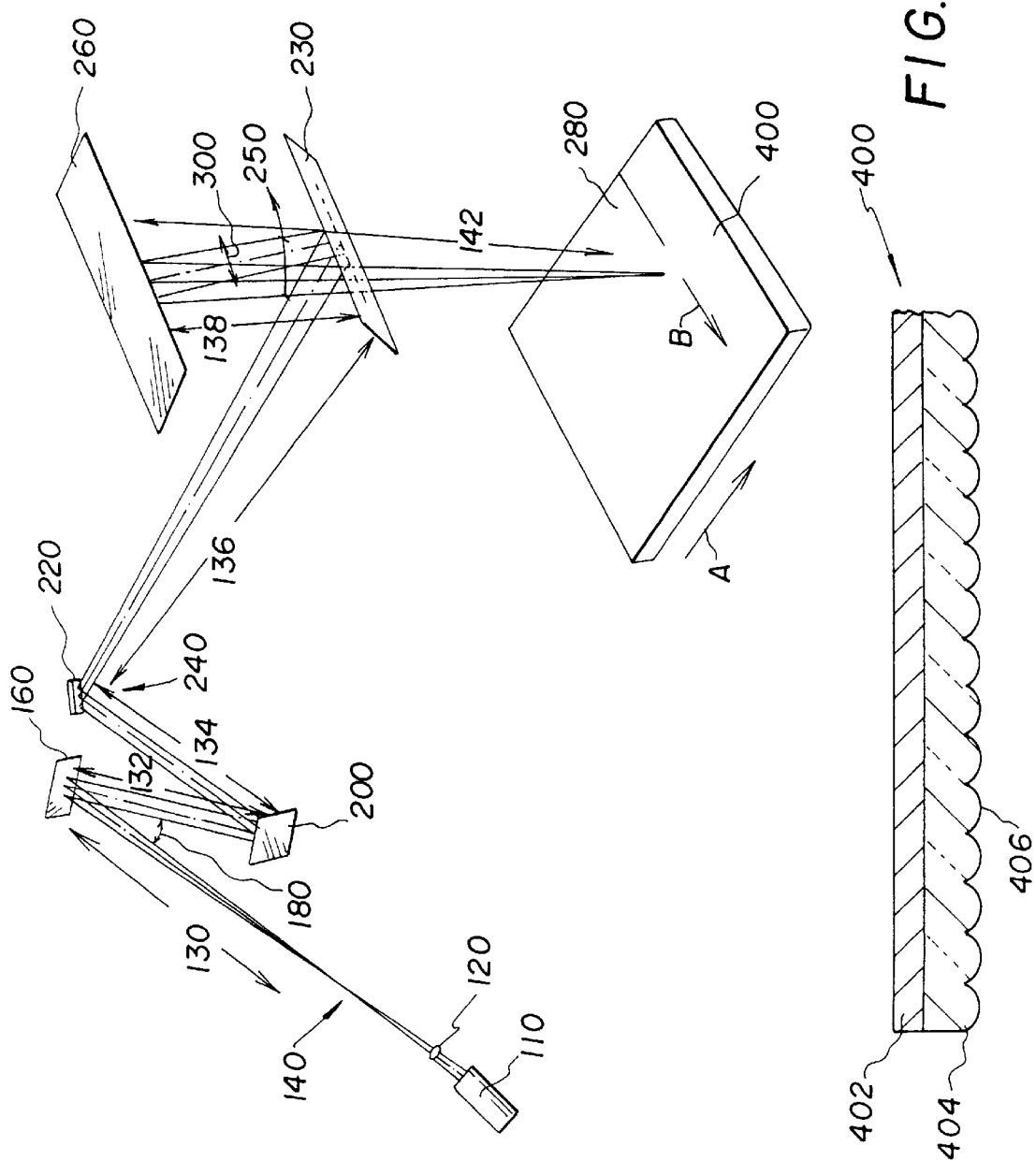

METHOD AND APPARATUS FOR CORRECTING COMA IN A HIGH RESOLUTION SCANNER

FIELD OF THE INVENTION

This invention relates in general to the field of high resolution optical scanners and more specifically relates to a technique to eliminate coma in the image formed by such scanners.

BACKGROUND OF THE INVENTION

Optical scanners are widely used in laser equipment to digitize images on reflective or transmissive media, or to print images on reflective or transmissive media. In the former application, the laser beam is unmodulated, while in the latter application, the laser beam is modulated with information. One application of an optical scanner is to create depth or motion images on lenticular material having a recording layer. Spatially multiplexed images are exposed onto the recording layer by a laser optical scanner.

It has been standard practice in the art of optical scanner design to correct the system for defects in the manufacturing of the optical scanning device. Such devices are usually rotating polygons, but they can also be galvanometers. The typical defect that occurs in fabricating polygons is called "pyramid error." This occurs when there is a difference in angle between polygon facets in the cross scan axis.

It is common in the art to conjugate the cross scan axis of the polygon facet to the image plane with a cylinder mirror. Since the laser spot must also be conjugated to the image plane, the laser must be focused at a certain spot size on the polygon facet. The size of the spot on the polygon facet depends on the desired spot size at the final image plane and the magnification of the conjugating cylinder mirror. If the required spot size at the image plane is small (i.e., a high resolution scanner) that will then require either a small spot on the polygon facet or a larger spot on the polygon facet with a high reducing magnification of the conjugating cylinder. If the spot on the polygon is small, artifacts in the image will be produced through diffraction of the light off of tooling marks and dust on the polygon facet. So, there is a desire to have the conjugating cylinder operate a reducing magnification less than 1× which will reduce the size of the image of the spot on the polygon. However, as the magnification of the conjugating cylinder departs from 1× it introduces coma into the image. This is the dilemma for the optical designer. The desire to have a small spot at the image plane requires either a small spot on the polygon facet (thus producing diffraction artifacts) or a high reducing magnification in the conjugating cylinder (thus producing coma) which actually enlarges the spot. This effect is also compounded by the incident angle that the light strikes the cylinder mirror. If the mirror reflects the light directly back towards its source, the image will have no coma, however, the image will not be accessible. If, on the other hand, the mirror turns the light at some angle so that the image is accessible, the off-axis image will exhibit coma.

FIG. 1a illustrates how a point source 10 imaged by the curved surface of a cylinder mirror 20 on axis (i.e., an angle of incidence of 0 degrees) is imaged to a coma-free image point 30.

FIG. 1b illustrates how a point source 10 imaged by the curved surface of a cylinder mirror 20 tilted by an angle 40 with respect to the optical axis produces an image 30 aberrated by a certain amount of coma 50. The amount of coma depends upon the radius of curvature of the surface, the distance between the object and the mirror surface, the distance between the mirror surface and the image, the angle of tilt of the mirror with respect to the optical axis, and the numerical aperture of the light. When the object distance and image distance are equal, the magnification is 1 and there is no coma.

The following patents disclose various techniques for correcting optical errors that do not satisfactorily solve these problems.

U.S. Pat. No. 4,759,593, issued Jul. 26, 1988, inventor Kessler.

U.S. Pat. No. 5,768,001, issued Jun. 16, 1998, inventors Kelley et al.

U.S. Pat. No. 5,168,386, issued Dec. 1, 1992, inventor Galbraith.

U.S. Pat. No. 4,848,885, issued Jul. 18, 1989, inventor Clark.

U.S. Pat. No. 4,832,429, issued May 23, 1989, inventor Nagler.

U.S. Pat. No. 5,267,057, issued Nov. 30, 1993, inventor Sasada.

U.S. Pat. No. 5,235,438, issued Aug. 10, 1993, inventor Sasada.

U.S. Pat. No. 4,633,272, issued Dec. 30, 1986, inventor Hardy.

U.S. Pat. No. 3,897,132, issued Jul. 29, 1975, inventors Meeussen et al.

SUMMARY OF THE INVENTION

According to the present invention, there is provided a solution to the problems of the prior art.

According to a feature of the present invention, there is provided a method of correcting a scanning device's reflective face's pyramid error as well as coma in the cross scan direction of an optical scanning system comprising the steps of: focusing a beam of light to a spot in the cross scan axis in the vicinity of the scanning device's reflective face with a first cylinder mirror which is tilted at an angle to produce a fixed, known amount of coma in the spot focused in the cross scan axis; and imaging the location of the reflective face, and thus reimaging the spot, to a second image position with a second cylinder mirror which is tilted at a second angle, the second cylinder mirror imaging the spot with a fixed and known amount of coma in the cross scan axis which is approximately equal to and opposite in sign to the first fixed, known amount of coma.

ADVANTAGEOUS EFFECT OF THE INVENTION

The invention has the following advantages.

1. This invention provides an optical solution which allows for the conjugating cylinder to work at a magnification other than 1× while the final image remains free from coma.

2. This invention provides a mathematical method of designing such a system.

BRIEF DESCRIPTION OF THE DRAWINGS

FIG. 3 is a diagrammatic view of an embodiment of the present invention.

FIG. 4 is a cross-sectional view of lenticular recording media.

DETAILED DESCRIPTION OF THE INVENTION

Figure 1A:
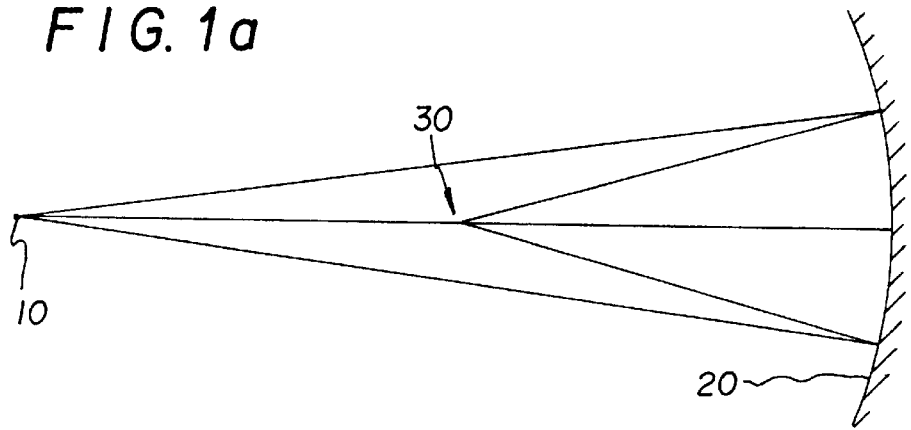
FIGS. 1a and 1b are diagrammatic views useful in understanding the source of errors in an optical scanning system.
Figure 1B:
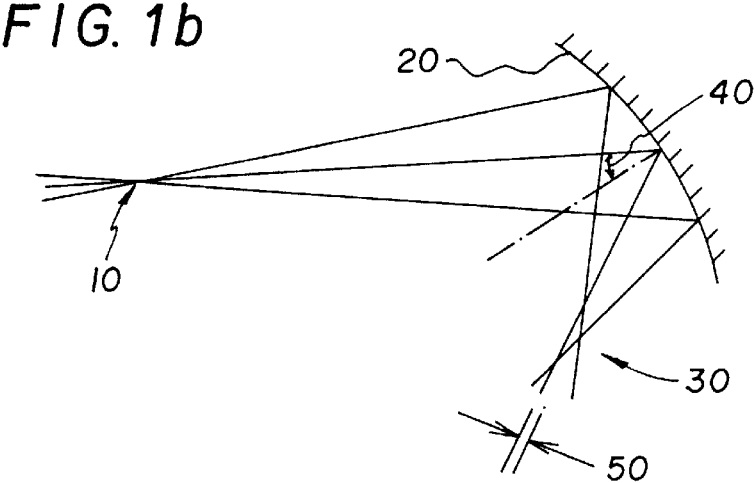
Figure 2:
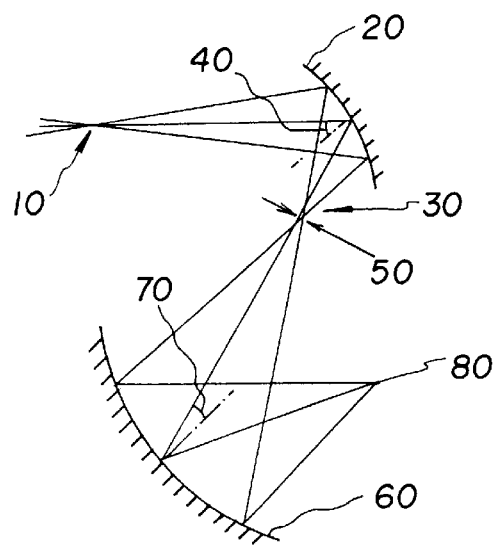
FIG. 2 is a diagrammatic view useful in understanding the present invention.

FIG. 2 illustrates the concept of the invention, that is, how a single point can be imaged by two cylinder mirrors with the final image having no coma.

A point source 10 is imaged at a magnification not equal to 1 by a curved mirror 20 tilted by an angle 40 producing an image 30 which is aberrated by a certain amount of coma 50. This aberrated image 30 is directed towards a second mirror surface 60 tilted by an angle 70 and reimages the aberrated image 30 to a final image 80 which is coma free.

FIG. 3 illustrates the preferred embodiment of the invention. Laser light 100 in one or more wavelengths exists from a source 110, such as modulated laser diode. A relay lens 120 images the laser light 100 to a beam waist location 140. The light travels a distance 130 from the beam waist location 140 and is reflected by a cylinder mirror 160 towards a second cylinder mirror 200 at an angle 180. The second cylinder mirror 200 has a power axis orthogonal to the first cylinder mirror 160 power axis. The first and second cylinder mirrors 160,200 are separated by an axial distance 132. The second cylinder mirror 200 creates a focused beam waist 240 in a plane parallel to the axis of the reflective face of a scanning device, such as the rotating polygon facet 220. Beam waist 240 has a fixed amount of coma. The polygon facet 220 redirects and scans the laser light towards a beam folding mirror 230 at an axial distance 136 from polygon facet 220. Beam folding mirror 230 directs the scanning beam by an angle 250 towards a third cylinder mirror 260 located an axial distance 138 from beam folding mirror 230. The third cylinder mirror 260 has a power axis in the cross-scan direction and redirects the laser beam by an angle 300. The beam is focused in the crossscan axis to the image plane 280 a distance 142 from cylinder mirror 260. Image plans 280 is represented by recording media 400.

The scanning device can also be a reciprocating galvo mirror.

The third cylinder mirror 260 conjugates the polygon facet plan 220 with the final image plane 280 in the cross-scan axis such that the coma induced by said second cylinder 200 is canceled at the image plane 280. This occurs when the following equation is satisfied:

$$l_1'^2[(l_1'/l_1)-1] \times \tan(I_1)/R_1 \cos(I_1) = l_2'^2[(l_2'/l_2)-1] \times \tan(I_2)/R_2 \cos(I_2)$$

where:

$l_1$ = Distance 30 + Distance 32
$l_1'$ = Distance 34
$l_2$ = Distance 36 + Distance 38
$l_2'$ = Distance 40
$I_1$ = (Angle 18)/2
$I_2$ = (Angle 38)/2
$R_1$ = Radius of Curvature of cylinder 20
$R_2$ = Radius of Curvature of cylinder 26

In one application of the present invention, recording media 400 is lenticular media (FIG. 4) including a recording layer 402 (such as photosensitive media) and a lenticular layer 404 including lenticular lenses 406. The modulated laser beam is scanned across media 400 in the direction of arrow B (FIG. 3), and parallel to the long cylindrical axes of the lenticular lenses in the media. Media 400 is moved in the direction of arrow A to provide scanning in a direction orthogonal to the direction of arrow B.

The invention has been described in detail with particular reference to certain preferred embodiments thereof, but it will be understood that variations and modifications can be effected within the spirit and scope of the invention.

What is claimed is:

1. A method of correcting a scanning device's reflective face's pyramid error as well as coma in the cross scan direction of an optical scanning system comprising the steps of:

focusing a beam of light to a spot in the cross scan axis in the vicinity of the scanning device's reflective face with a first cylinder mirror which is tilted at an angle to produce a fixed, known amount of coma in said spot focused in the cross scan axis; and imaging the location of said reflective face, and thus reimaging said spot, to a second image position with a second cylinder mirror which is tilted at a second angle, said second cylinder mirror imaging said spot with a fixed and known amount of coma in the cross scan axis which is approximately equal to and opposite in sign to said first fixed, known amount of coma.

2. A method of correcting a scanning device's reflective face's pyramid error as well as coma in the cross scan direction comprising the steps of:

focusing a light beam a distance $l_1$ from a first cylinder mirror having a radius of curvature $R_1$;

tilting said first cylinder mirror by an angle $I_1$ with respect to the center of said beam so that said beam is refocused essentially at the position of a reflective face located an axial distance $l_1'$ from said first cylinder mirror;

reflecting said beam off said reflective face towards a second cylinder mirror having a radius of curvature $R_2$, said second cylinder mirror located at an axial distance $l_2$ from said reflective face and being tilted by an angle $I_2$ with respect to the center of said incoming beam; and reflecting said beam off of said second cylinder and refocusing said beam to an image plane located a distance $l_2'$ from said second cylinder wherein the values of $l_1$, $R_1$, $I_1$, $l_1'$, $l_2$, $R_2$, $I_2$, and $l_2'$ are essentially related by the expression:

$$l_1'^2[(l_1'+l_1)-1] \times \tan(I_1) + R_1 \cos(I_1) = l_2'^2[(l_2'+l_2)-1] \times \tan(I_2) + R_2 \cos(I_2)$$

3. The method in claim 2 wherein said focused beam is folded by one or more flat beam folding mirrors before being focused by said first cylinder mirror such that the axial distance from said focused beam and said cylinder mirror equals $l_1$.

4. The method in claim 2 wherein the said beam reflecting off said reflective face is folded by one or more flat beam folding mirrors before being focused by said second cylinder mirror such that the axial distance from said reflective face and said second cylinder mirror equals $l_2$.

5. The method in claim 2 wherein the separation between said focused beam and said first cylinder mirror includes one or more cylindrical optical components whose power axis is orthogonal to said first cylinder.

6. The method in claim 5 wherein said additional cylindrical optical components are cylinder mirrors.

7. The method in claim 5 wherein said additional cylindrical optical components are cylinder lenses.

8. The method of claim 2 wherein said image plane is defined by recording media and wherein said focussed light beam is a laser beam modulated with information which is recorded on said recording media.

9. The method of claim 8 wherein said recording media is lenticular recording media.

10. The method of claim 2 wherein said scanning device is a rotating polygon having a plurality of reflective facets.

11. The method of claim 2 wherein said scanning device is a reciprocating galvo mirror.

12. Apparatus for correcting a scanning device's reflective face's pyramid error as well as coma in the cross scan direction of an optical scanning system comprising:

means for focusing a beam of light to a spot in the cross scan axis in the vicinity of the scanning device's reflective face with a first cylinder mirror which is tilted at an angle to produce a fixed, known amount of coma in said spot focused in the cross scan axis; and means for imaging the location of said reflective face, and thus reimaging said spot, to a second image position with a second cylinder mirror which is tilted at a second angle, said second cylinder mirror imaging said spot with a fixed and known amount of coma in the cross scan axis which is approximately equal to and opposite in sign to said first fixed, known amount of coma.

13. Apparatus for correcting a scanning device's reflective face's pyramid error as well as coma in the cross scan direction comprising:

means for focusing a light beam a distance $l_1$ from a first cylinder mirror having a radius of curvature $R_1$;

means for tilting said first cylinder mirror by an angle $I_1$ with respect to the center of said beam so that said beam is refocused essentially at the position of a reflective face located an axial distance $l_1'$ from said first cylinder mirror;

means for reflecting said beam off said reflective face towards a second cylinder mirror having a radius of curvature $R_2$, said second cylinder mirror located at an axial distance $l_2$ from said reflective face and being tilted by an angle $I_2$ with respect to the center of said incoming beam; and means for reflecting said beam off of said second cylinder and refocusing said beam to an image plane located a distance $l_2'$ from said second cylinder wherein the values of $l_1$, $R_1$, $I_1$, $l_1'$, $l_2$, $R_2$, $I_2$, and $l_2'$ are essentially related by the expression:

$$l_1'^2[(l_1'\div l_1)-1]\times\tan(I_1)\div R_1\cos(I_1) = l_2'^2[(l_2'\div l_2)-1]\times\tan(I_2)\div R_2\cos(I_2).$$

14. The apparatus of claim 13 wherein said focused beam is folded by one or more flat beam folding mirrors before being focused by said first cylinder mirror such that the axial distance from said focused beam and said cylinder mirror equals $l_1$.

15. The apparatus of claim 13 wherein the said beam reflecting off said reflective face is folded by one or more flat beam folding mirrors before being focused by said second cylinder mirror such that the axial distance from said reflective face and said second cylinder mirror equals $l_2$.

16. The apparatus of claim 13 wherein the separation between said focused beam and said first cylinder mirror includes one or more cylindrical optical components whose power axis is orthogonal to said first cylinder.

17. The apparatus of claim 16 wherein said one or more cylindrical optical components are cylinder mirrors.

18. The apparatus of claim 16 wherein said one or more cylindrical optical components are cylinder lenses.

19. The apparatus of claim 13 wherein said image plane is defined by recording media and wherein said focussed light beam is a laser beam modulated with information which is recorded on said recording media.

20. The apparatus of claim 19 wherein said recording media is lenticular recording media.

21. The apparatus of claim 13 wherein said scanning device is a rotating polygon having a plurality of reflective facets.

22. The apparatus of claim 13 wherein said scanning device is a reciprocating galvo mirror.

* * * * *